United States Patent
Buttner

(10) Patent No.: US 10,717,004 B2
(45) Date of Patent: Jul. 21, 2020

(54) METHOD AND SYSTEM FOR REAL-TIME ANIMATION GENERATION USING MACHINE LEARNING

(71) Applicant: Unity IPR ApS, Copenhagen K (DK)

(72) Inventor: Michael Buttner, Georgetown (CA)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 16/444,977

(22) Filed: Jun. 18, 2019

(65) Prior Publication Data

US 2019/0381404 A1 Dec. 19, 2019

Related U.S. Application Data

(60) Provisional application No. 62/686,546, filed on Jun. 18, 2018.

(51) Int. Cl.
*A63F 13/573* (2014.01)
*G06N 3/08* (2006.01)
(Continued)

(52) U.S. Cl.
CPC ............ *A63F 13/573* (2014.09); *A63F 13/65* (2014.09); *G06N 3/08* (2013.01); *G06T 13/00* (2013.01)

(58) Field of Classification Search
CPC ......... G06T 13/40; G06T 13/00; G06T 19/00; G06T 17/20; G06T 17/00; G06T 15/10; G06T 15/00; G06T 17/10; G06T 17/005; A63F 13/573; A63F 13/60; A63F 13/65; G06N 3/08
See application file for complete search history.

(56) References Cited

U.S. PATENT DOCUMENTS

| 9,827,496 B1 | 11/2017 | Zinno |
| 2003/0156111 A1* | 8/2003 | Joshi ...................... G06T 17/20 345/420 |
| 2019/0381404 A1* | 12/2019 | Buttner .................. A63F 13/65 |

FOREIGN PATENT DOCUMENTS

| WO | 2012069022 | 5/2012 |
| WO | 2019243899 | 12/2019 |

OTHER PUBLICATIONS

Anonymous. "Auto-Conditioned LSTM Network for Extended Complex Human Motion Synthesis", Under review as a conference paper at ICLR 2018, 1-13.
(Continued)

*Primary Examiner* — Todd Buttram
(74) *Attorney, Agent, or Firm* — Schwegman Lundberg & Woessner, P.A.

(57) ABSTRACT

A method of generating an image frame for depicting a posing of a character in a game is disclosed. A dominant atom from a set of active atoms associated with the character is determined. A motion controlling ability from a plurality of abilities of the character is determined. A motion fragment for the dominant atom is determined based on pose data and future trajectory data in a motion library associated with the dominant atom; A predicted future trajectory of the character is calculated. Based on a detection of a future collision or problem between the predicted future trajectory and an environment within the game, a combined future trajectory is calculated based on the predicted future trajectory and an additional future trajectory. The character is posed in the image frame based on a weighted combination of poses associated with the set of active atoms.

20 Claims, 7 Drawing Sheets

(51) Int. Cl.
A63F 13/65 (2014.01)
G06T 13/00 (2011.01)

(56) References Cited

OTHER PUBLICATIONS

Arikan, Okan, et al., "interactive Motion Generation from Examples", To appear in the ACM SIGGRAPH conference proceedings, (2002), 1-8.

Borno, M. Al, et al., "Feedback Control for Rotational Movements in Feature Space", Eurographics 2014, vol. 33, No. 2, (2014), 9 pgs.

Chai, Jinxiang, et al., "Performance Animation from Low-dimensional Control Signals", SIGGRAPH '05 ACM SIGGRAPH 2005 Papers, Retrieved from the Internet: <http://graphics.cs.cmu.edu/projects/performance-animation/jchai_pa.pdf>, 11 pgs.

Coros, Stelian, et al., "Locomotion Skills for Simulated Quadrupeds", To appear in the ACM SIGGRAPH 2011 conference proceedings, (2011), 1-11.

Fragkiadaki, Katerina, et al., "Recurrent Network Models for Human Dynamics", ICCV '15 Proceedings of the 2015 IEEE International Conference on Computer Vision (ICCV), (Dec. 7-13, 2015), 4346-4354.

Grochow, Keith, et al., "Style-Based Inverse Kinematics", To appear in ACM Trans. on Graphics (Proc. SIGGRAPH'04), 1-10.

Holden, Daniel, et al., "A Deep Learning Framework for Character Motion Synthesis and Editing", ACM Transactions on Graphics, vol, 5, Issue 4, (Jul. 2016), 11 pgs.

Holden, Daniel, et al., "Learning Motion Manifolds with Convolutional Autoencoders", SIGGRAPH Asia 2015 Technical Briefs, Kobe, Japan, (Nov. 2-6, 2015), 4 pgs.

Holden, Daniel, et al., "Phase-Functioned Neural Networks for Character Control", ACM Transactions on Graphics. vol. 36, No. 4, (Jul. 2017), 13 pgs.

Hsu, Eugene, et al., "Style Translation for Human Motion", To Appear in SIGGRAPH 2005, (2005), 8 pgs.

Kovar, Lucas, et al., "Automated Extraction and Parameterization of Motions in Large Data Sets", To Appear in Transactions on Graphics, 23, 3 (SIGGRAPH 2004), (2004), 1-10.

Kovar, Lucas, et al., "Motion Graphs", To appear in Proceedings of SIGGRAPH '02, (2002), 1-10.

Lau, Manfred, et al., "Behavior Planning for Character Animation", Eurographics/ACM SIGGRAPH Symposium on Computer Animation (2005), (2005), 10 pgs.

Lee, Jehee, et al., "Interactive Control of Avatars Animated with Human Motion Data", SIGGRAPH '02 Proceedings of the 29th annual conference on Computer graphics and interactive techniques, (2002), 10 pgs.

Lee, Yongjoon, et al., "Motion Fields for Interactive Character Animation", ACM Transactions on Graphics 29(5) (SIGGRAPH Asia 2010), 8 pgs.

Lee, Yongjoon, et al., "Motion Fields for Interactive Character Locomotion", Communications of the ACM, vol. 57, No. 6, (Jun. 2014), 101-108.

Levine, Sergey, et al., "Continuous Character Control with Low-Dimensional Ernbeddings", ACM Transactions on Graphics (TOG), vol. 31 Issue 4 Article No. 28, Retrieved from the Internet: <https://homes.cs.washington.edu/~zoran/ccclde.pdf>, (Jul. 2012), 10 pgs.

Levine, Sergey, et al., "Physically Plausible Simulation for Character Animation", Eurographics/ ACM SIGGRAPH Syrnposium on Computer Animation (2012), (2012), 10 pgs.

Liu, C. Karen, et al., "Learning Physics-Based Motion Style with Nonlinear Inverse Optimization", SIGGRAPH '05 Papers, ACM, (2005), 11 pgs.

Liu, C. Karen, et al., "Synthesis of Complex Dynamic Character Motion from Simple Animations", Published in ACM Transactions on Graphics (SIGGRAPH 2002), (2002), 1-9.

Liu, Libin, et al., "Learning to Schedule Control Fragments for Physics-Based Characters Using Deep Q-Learning", ACM Transactions on Graphics, vol. 36, No. 3, Article 29, (Jun. 2017), 14 pgs.

Merel, Josh, et al., "Learning human behaviors from motion capture by adversarial imitation", Retrieved from the Internet: <https://arxiv.org/abs/1707.02201>, (2017), 1-12.

Min, Jianyuan, et al., "Motion Graphs++: a Compact Generative Model for Semantic Motion Analysis and Synthesis", ACM Transactions on Graphics, vol. 31, No. 6, Article 153, (Nov. 2012), 12 pgs.

Mukai, Tomohiko, et al., "Geostatistical Motion Interpolation", To appear in the ACM SIGGRAPH 2005 conference proceedings, (2005), 1-9.

Peng, Xue Bin, et al,, "Dynamic Terrain Traversal Skills Using Reinforcement Learning", ACM Trans, Graph. 34, 4, Article 80, (Jul. 2015), 11 pgs.

Peng, Xue Bin, et al., "Terrain Adaptive Locomotion Skills Using Deep Reinforcement Learning", To appear in ACM TOG 35(4), (2016), 1-15.

Rose, Charles, et al., "Verbs and Adverbs: Multidimensional Motion Interpolation Using Radial Basis Functions", IEEE Computer Graphics and Applications, (1998), 1-17.

Safonova, Alla, et al., "Construction and optimal search of interpolated motion graphs", SIGGRAPH '07, ACM, papers, Article No. 106, (2007), 11 pgs.

Safonova, Alla, et al., "Synthesizing Physically Realistic Human Motion in Low-Dimensional, Behavior-Specific Spaces". SIGGRAPH '04, ACM, Papers, (2004). 8 pgs.

Tautges, Jochen, et al., "Motion Reconstruction Using Sparse Accelerometer Data", ACM Transactions on Graphics, vol. VV, No. N, Article XXX, (2011), 1-12.

Taylor, Graham W, et al., "Factored Conditional Restricted Boltzmann Machines for Modeling Motion Style", ICML '09 Proceedings of the 26th Annual International Conference on Machine Learning, (2009), 8 pgs.

Taylor, Graham W, et al., "Two Distributed-State Models for Generating High-Dimensional Time Series*", Journal of Machine Learning Research 12. (2011), 1025-1068.

Wampler, Kevin, et al., "Generalizing Locomotion Style to New Animals With Inverse Optimal Regression", ACM Transactions on Graphics (TOG), vol. 33 Issue 4. Article No. 49 (Jul. 2014), 11 pgs.

Wampler, Kevin, et al., "Optimal Gait and Form for Animal Locomotion", SIGGRAPH '09, ACM, papers, Article No. 60, (2009), 8 pgs.

Wang, Jack M, et al., "Gaussian Process Dynamical Models for Human Motion", IEEE Transactions on Pattern Analysis and Machine Intelligence, vol. 30, No. 2, (Feb. 2008), 283-298.

Xia, Shihong, et al., "Realtime Style Transfer for Unlabeled Heterogeneous Human Motion", CM Transactions on Graphics, vol. 34, Issue 4, (Aug. 2015), 10 pgs.

Ye, Yuting, et al., "Synthesis of Detailed Hand Manipulations Using Contact Sampling", ACM Transactions on Graphics (TOG), vol. 31 Issue 4, Article No. 41, (Jul. 2012), 10 pgs.

Yin, Kangkang, et al., "SIMBICON: Simple Biped Locomotion Control", ACM Transactions on Graphics 26(3):105, (Jul. 2007), 10 pgs.

"International Application Serial No. PCT/IB2019/000809, International Search Report dated Dec. 2, 2019", 3 pgs.

"International Application Serial No. PCT/IB2019/000809, Written Opinion dated Dec. 2, 2019", 7 pgs.

* cited by examiner

METHOD AND SYSTEM FOR REAL-TIME ANIMATION GENERATION USING MACHINE LEARNING

CROSS REFERENCE TO RELATED APPLICATIONS

This application claims the benefit of U.S. Provisional Application No. 62/686,546, filed Jun. 18, 2018, entitled "METHOD AND SYSTEM FOR REAL-TIME ANIMATION GENERATION USING MACHINE LEARNING," which is incorporated by reference herein in its entirety.

TECHNICAL FIELD

The present invention relates to the field of real-time animation generation; specifically using machine learning.

BACKGROUND OF THE INVENTION

In the world of video games and real-time character animation, existing animation systems including animation controller systems and blend tree systems have a high level of control with respect to gameplay requirements and visual fidelity. Animation quality can be high with the two systems, but the required time investment grows exponentially. There are many different approaches that have been proposed to ease the burden on game developers in order to generate high quality character animation while allowing precise control of responsiveness. Most of the approaches have one or more of the following drawbacks: limited to a particular type of movement (e.g., locomotion), are expensive in terms of runtime performance, produce poor quality, have low turnaround times and don't allow for procedural modifications (e.g., to stretch and squash a jump animation to match an environment).

Overall, the different approaches can be broadly divided into physically-based controllers and data-driven controllers. Physically-based controllers are effective in generating dynamic movements, where the characters make use of elasticity, energy minimization and conservation of momentum. Such methods can be further sub-divided into trajectory-based approaches where the motion is optimized based on physical properties such as torques, momentum and feasibility, and torque-based approaches where the body is directly driven by torques. Physically-based controllers are powerful tools for designing dynamic plausible movements though subtle minor voluntary movements that make the motion realistic. However, they tend to be skipped due to the difficulty in describing them from simple rewards such as moving forward, energy minimization and balance control. Physically-based controllers are relatively expensive with respect to computation due to the fact that they need to perform detailed collision detection and dynamics calculations.

A counterpart of physically-based animation is data-driven character animation techniques that make use of motion capture data for interactive character control. Data structures such as motion graphs and finite state machines are used to synthesize continuous character movements from unstructured motion capture data. As connectivity within the motion graph can significantly affect the responsiveness of a controlled character, computer games and other interactive applications often use the more straightforward structure of a finite state machines where the connectivity is explicit and the subsequent motion is predictable.

Most methods based on classic machine learning techniques suffer from scalability issues: they first require a huge amount of data preprocessing including motion classification and alignment. Most existing animation systems handle collisions between animated characters and a surrounding environment poorly.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
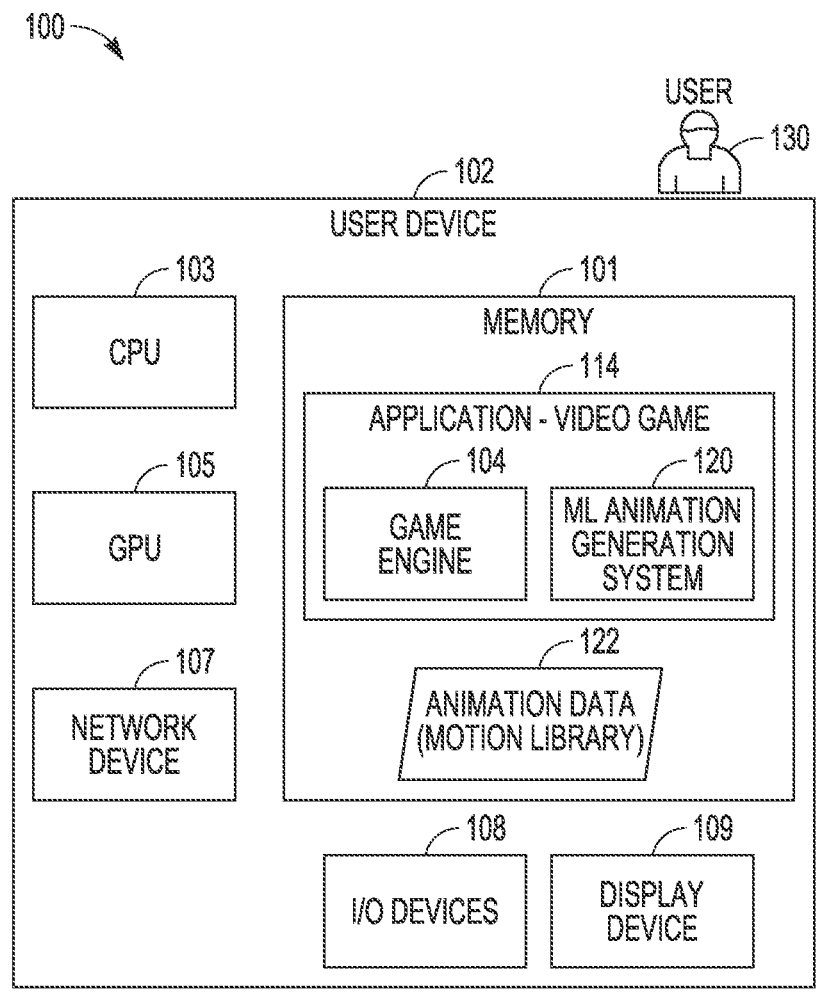
FIG. 1 is a schematic illustrating a machine learning animation generation system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In example embodiments, various operations or methods described herein solve problems related to existing systems being purely reactive systems that do not anticipate events beyond the current frame. Such systems may detect a collision only when it happens and not before. Thus, for example, it may be too late to play a good collision animation and also too late to avoid the obstacle.

To that end, in example embodiments, a real-time character animation controller or system is disclosed that can be used for any kind of movement. It is capable of animating any kind of skeletal hierarchy because, as one example, unlike conventional systems, it does not rely on footfall patterns to subdivide animation data into cycles in order to guide the motion synthesis process along an animation time-line. Instead, the operations and methods disclosed herein, which are implemented by the system, provide for more fine-grained movement and animation control than conventional systems without requiring prohibitively expensive pre-processing times. The motion synthesis system disclosed herein thus provides "ground truth" motion synthesis. The runtime performance and memory requirements of this system compare favorably against conventional animation graph systems, but the system allows for better movement and animation control than conventional systems.

In example embodiments, a dominant atom from a set of active atoms associated with a character is determined based on weights associated with the set of active atoms, each atom of the set of active atoms including a reference to data defining a character pose within a motion library. A motion controlling ability from a plurality of abilities of the character is determined based on priorities of the abilities and a current game state produced within a game. A motion fragment for the dominant atom is determined based on pose data and future trajectory data in the motion library associated with the dominant atom. A predicted future trajectory of the character is calculated based on the motion fragment, the controlling ability, and control data from an input device. Based on a detection of a future collision or problem between the predicted future trajectory and an environment within the game, a combined future trajectory is calculated based on the predicted future trajectory and an additional future trajectory. A combined motion fragment is determined by replacing the future trajectory of the motion fragment with the predicted future trajectory or combined future trajectory. The combined motion fragment is converted to a hash value using a hashing function and using a nearest neighbor search to find the closest match between the hash value and a second hash value in the motion library. The atom associated with the second hash value is added to the set of active atoms as a target atom. The character is posed in a frame based on a weighted combination of poses associated with the set of active atoms. The weights associated with the set of active atoms are changed based on a time function, the changing including increasing the weight of the target atom and decreasing the weight of all other atoms.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

The term 'environment' used throughout the description herein is understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used herein is understood to include any digital object or digital element within an environment. A game object can represent almost anything within the environment; including characters (humanoid or other), weapons, scene elements (e.g., buildings, trees, cars, treasures, and the like), backgrounds (e.g., terrain, sky, and the like), lights, cameras, effects (e.g., sound and visual), animation, and more. A game object is associated with data that defines properties and behavior for the object.

The terms 'asset', 'game asset', and 'digital asset', used herein are understood to include any data that can be used to describe a game object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

Turning now to the drawings, systems and methods, including non-routine or unconventional components or operations, or combinations of such components or operations, for machine learning animation generation in accordance with embodiments of the invention are illustrated. In accordance with an embodiment, and shown in FIG. 1, the user device 102 includes one or more central processing units 103 (CPUs), and graphics processing units 105 (GPUs). The CPU 103 is any type of processor, processor assembly comprising multiple processing elements (not shown), having access to a memory 101 to retrieve instructions stored thereon, and execute such instructions. Upon execution of such instructions, the instructions implement the user device 102 to perform a series of tasks as described herein. The memory 101 can be any type of memory device, such as random access memory, read only or rewritable memory, internal processor caches, and the like.

The user device 102 also includes one or more input/output devices 108 such as, for example, a keyboard or keypad, mouse, pointing device, and touchscreen. The user device 102 further includes one or more display devices 109, such as a computer monitor, a touchscreen, and a head mounted display, which may be configured to display digital content including video, a video game environment, an integrated development environment and a virtual simulation environment to the user 130. The display device 109 is driven or controlled by the one or more GPUs 105 and optionally the CPU 103. The GPU 105 processes aspects of graphical output that assists in speeding up rendering of output through the display device 109. The user device 102 also includes one or more networking devices 107 (e.g., wired or wireless network adapters) for communicating across a network.

The memory 101 in the user device 102 can be configured to store an application 114 (e.g., a video game, a simulation, or other software application) which can include a game engine 104 (e.g., executed by the CPU 103 or GPU 105) that communicates with the display device 109 and also with other hardware such as the input device(s) 108 to present the application to the user 130. The game engine 104 would typically include one or more modules that provide the following: animation physics for game objects, collision detection for game objects, rendering, networking, sound, animation, and the like in order to provide the user with an application environment (e.g., video game or simulation environment). The application 114 includes a machine learning animation generation system 120 (or MLAG system) that provides various functionality as described herein. In accordance with an embodiment, the memory 101 includes animation data (e.g., a motion library as described below) that is used by the MLAG system 120 as described herein.

Each of the game engine 104, the application 114, and the MLAG system 120 includes computer-executable instructions residing in the memory 101 that are executed by the CPU 103 and optionally with the GPU 105 during operation. The game engine 104 includes computer-executable instructions residing in the memory 101 that are executed by the CPU 103 and optionally with the GPU 105 during operation in order to create a runtime program such as a game engine. The application 114 includes computer-executable instructions residing in the memory 101 that are executed by the CPU 103 and optionally with the GPU 105 during operation in order to create a runtime application program such as a video game. The game engine 104 and the MLAG system 120 may be integrated directly within the application 114, or may be implemented as external pieces of software (e.g., plugins).

There is described herein systems, methods and apparatuses to generate animation using machine learning. There are many different embodiments which are described here. The systems and methods described herein use machine learning to generate natural looking animations for a virtual character in an environment. The virtual character having a rig or skeleton. The systems and methods work in real-time, and thus are suitable for the video game and simulation industry. The systems and methods use input animation data (e.g., mocap data) to animate the virtual character in an interactive simulation or a video game. The system that performs the methods is referred to herein as the machine learning animation generation system, or the MLAG system, or just the system. The method performed by the MLAG system is referred to herein as the machine learning animation generation method, or MLAG method, or just the method. During operation (in both the video game mode and simulation mode) the system receives input from an external controlling agent that provides high level animation instructions for the character. The high level animation instructions direct the character to perform actions which include typical video game animation instructions such as 'jump up now', 'crouch now', 'turn right', 'run to the left', 'jump and turn left', 'throw a dagger', 'sit down', 'point a weapon', 'shoot a weapon', and the like. The high level animation instructions are used by the MLAG system to animate the character using the input animation data. The external controlling agent can include a human operator (e.g., a game player, simulation player, or just player), and also a high-level artificial intelligence (AI) agent. The human operator might use a joystick, keyboard, touchscreen, hand tracker or any other input device (e.g., such as the input device 108 on the user device 102) to provide the high level animation instructions. In both cases of controller (e.g., human controller and AI controller), the actions of the controlled character as determined by the instructions of the controller (e.g., the particular motions that the character performs) cannot be predicted in advance. Since the actions cannot be predicted in advance, the input animation data (e.g., recorded with motion capture) cannot be played directly (e.g., as is) since the captured motions therein do not exactly match the actions requested by the external controlling agent. In accordance with an embodiment, the MLAG systems and methods described herein are structured to generate animations that are substantially close to the input animation data to look natural while being responsive in real-time to the input from the external controlling agent. In order to achieve the most realistic animation output from the systems and methods described herein, the input animation data should include examples of natural motions recorded and converted to animation data using mocap technology; however, other sources of animation data can be used (e.g., creating animation data with animation software).

In accordance with an embodiment, at a frame (e.g., a frame within a game or simulation) the MLAG system has to decide the next pose of a character given both a current pose, a position, and a goal for the character. The character goal is represented by a short fragment of a trajectory that the MLAG system wants the character to follow in the immediate future (e.g., over a plurality of frames after the frame). The task of deciding the next pose is solved by the MLAG system in part by searching a motion library database (described below) for a reference point (e.g., a frame) wherein a series of poses and second future trajectory best match the current series of poses and goal.

As explained below, the MLAG system uses a machine learning mechanism that allows a large reduction of the real-time execution time when compared to existing methods. The improved performance of the MLAG system allows it to animate a larger number of characters simultaneously while at the same tune and using a large data set of motions, which improves the quality of animations produced by the MLAG system when compared to existing methods.

For simplicity and clarity of the description herein, the following notations and conventions are used: A coordinate is a 3D vector (e.g., $p=(x,y,z)$); An orientation is a quaternion $q=(q_0,q_1,q_2,q_3)$); and a transform is a pair coordinate-orientation (e.g., $T=(p, q)$). Embodiments of the present disclosure are not limited in this regard. Any notation or convention can be used to represent a coordinate, an orientation and a transform.

Figure 2:
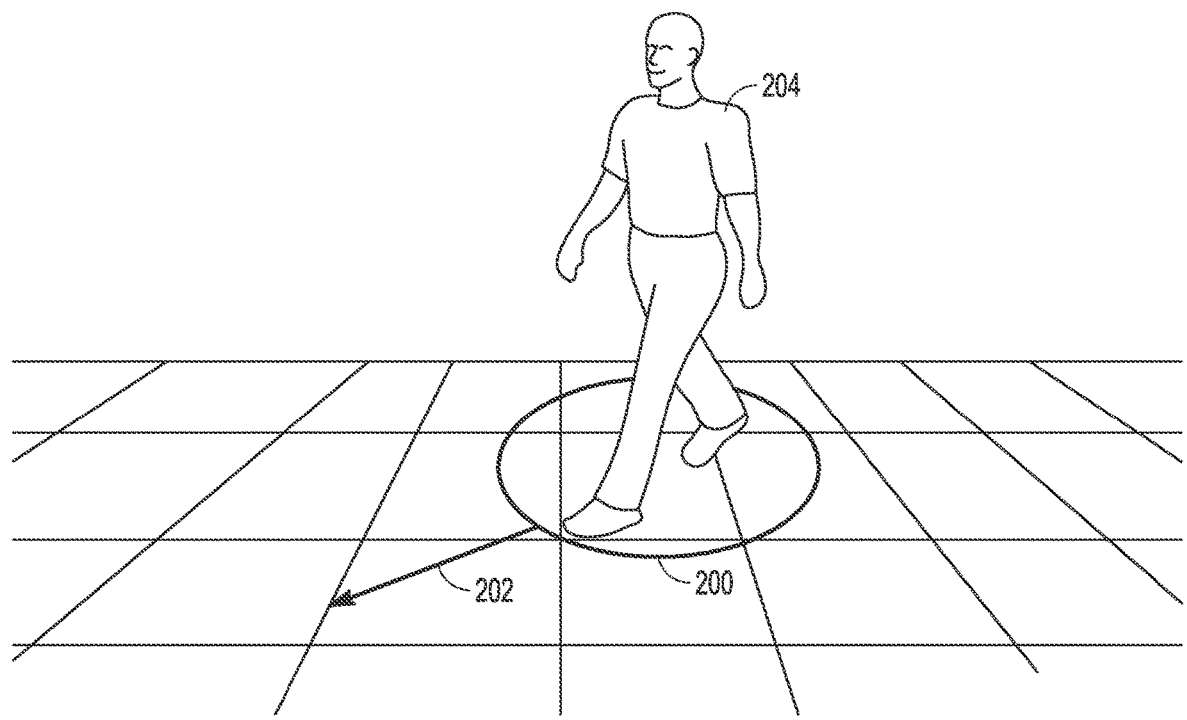
FIG. 2 is a schematic illustrating a root transform for a character in an environment within a machine learning animation generation system, in accordance with an embodiment.

In accordance with an embodiment, and shown in FIG. 2 is a schematic diagram of a root transform. A character rig includes a root transform T that includes values for a position coordinate and orientation of the character in a game world coordinate system. In FIG. 2, the character rig 204 is shown as a fully rendered humanoid character with a full body and clothes. It would be known by those familiar with the art that the character rig which includes bones is included within the character and is not directly shown in the figure. The character rig 204 is shown with an orientation represented by the arrow 202 and a position represented by the circle 200 at the base of the character rig 204. The exact position may be taken as the center of the circle 200. The circle 200 and associated position of the character rig 204, while shown in FIG. 2 as being associated with the base of the character rig 204, is not limited to the base of the character rig 204 and may be associated with any part of the character rig 204. The character rig includes a set of initial joint positions $J=\{J_i; i=1,2,\ldots M\}$ where $J_i=(xi,yi,zi)$. To minimize run time computational complexity, the input animation data is preprocessed so that all joint positions therein are expressed relative to a root transform T. Throughout the description herein.

Throughout the description herein, the transform T is called the 'position' of the character, and the collective value of joints J is called the 'pose' of the character, and the pair of the position-pose is referred to as the state $s=(T,J)$ of the character.

Data Preparation

In accordance with an embodiment, the motion library is created prior to any real-time functions of the MLAG system. The motion library is created by processing input animation data whereby the processing organizes the input animation data in the motion library in such a way that the data is optimized for the MLAG methods described below in order to accelerate runtime execution. The input animation data may be generated by a motion capture (mocap) system recording human motion and translating the motion into digital animation data, and it may be generated manually by an artist using an animation creation software tool. In accordance with an embodiment, input animation data is processed to include a set of clips $C=\{C_i; i=0,1, \ldots N\}$ wherein each $C_i$ is a clip and N is any positive integer. Within the set of clips C, each clip comprises a series of character states denoted as: $C_i=\{(T_i^k, J_i^k), k=0,1, \ldots L_i\}$ wherein k and L are positive integers.

In accordance with an embodiment, all the animation clip segments selected from the input animation data are stored in a large matrix denoted herein as 'D' and referred to as a motion library D' or just 'motion library'. As part of processing the input animation data, all animation clips in the set of animation clips C are sampled at a predetermined target framerate (e.g., 30 frames per second) to ensure a consistent sampling rate across the animation clips. As part of processing the input animation data, all poses within all clips are arranged into the motion library wherein each column corresponds to a pose and each row represents a temporal axis of a single joint. Clips are arranged sequentially in the motion library (e.g., different clips are not mixed), and poses are sorted in their original order within each clip. Given a point in the motion library (e.g., a specific pose), the MLAG system 100 can extract a past set of poses and a future trajectory associated with the pose by extracting data points before and after the pose.

In accordance with an embodiment, as part of processing the input animation data, when constructing the motion library, the clips (and the poses therein) can be labeled with one or more labels referred to herein as motion islands. A motion island is a general category for motion that typically has specific motion associated with the category. For example, locomotion, parkour, and climbing are all considered motion islands since they have distinct and recognizable types of motion. In accordance with an embodiment, the labeling of the data into the motion island categories can be done manually and can be done automatically (e.g., using machine learning).

In accordance with an embodiment, and as part of processing the input animation data, a grouping of data within the motion library referred to as a motion fragment (described below with respect to FIG. 3) may be put through a siamese hashing neural network (described below) to transform tire motion fragment data into a hash code for efficient searching during runtime operation. The siamese hashing neural network is a nonlinear hashing function that associates a compact B-bit hash code to motion fragments within the motion library.

In accordance with an embodiment, the labels may include extra information required (e.g., by gameplay code) to implement movements properly. This can include information regarding contact points during a movement wherein a character makes contact with the environment or with another character. The contact point information can include data regarding the relative position of the contact point and the surface normals at a point of contact, and the like. For example, consider the MLAG system 100 applied to generate parkour animation using mocap data that includes parkour movement (e.g., where parkour is the training discipline that includes running, jumping, vaulting, crawling, climbing, rolling and the like over obstacles). A clip in the motion library featuring a parkour move can be given a label which includes position data for contact points with an environment (e.g., position data represented relative to a character position at a time of contact with the environment). During operation, the MLAG system 100 would use the contact point information to determine if the animation clip can be used by the system given a current state for a character, a goal, and topology data of an environment surrounding the character.

Figure 3:
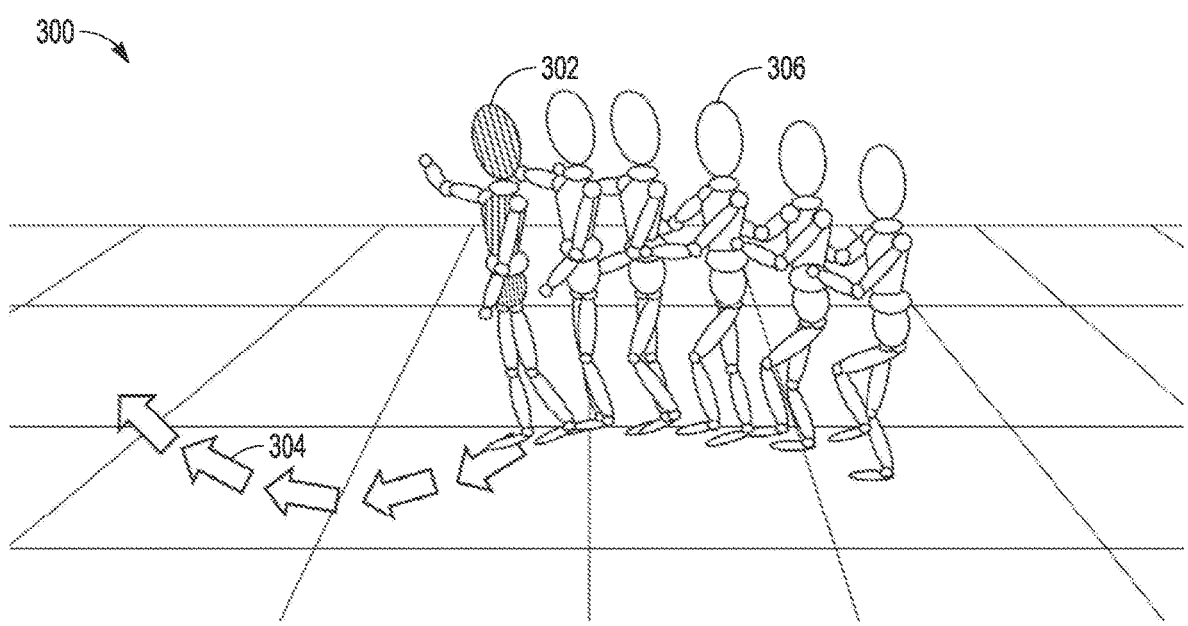
FIG. 3 is a schematic illustrating a visual representation of a motion fragment within a machine learning animation generation system, in accordance with an embodiment.

In accordance with an embodiment, FIG. 3 shows a schematic of a character motion fragment 300 which includes set of past character poses 306 and a future root trajectory 304 leading away from a reference pose 302 (e.g., associated with a reference frame) and over a temporal horizon. While shown as a series of arrows in FIG. 3, a future root trajectory 304 for a character in the game world is represented by a sequence of root transforms (e.g., as shown schematically in FIG. 2) that include position and orientation, and that span over an immediate future (e.g., a plurality of frames after the reference frame as represented in FIG. 3 by the pose 302 at the start of the future trajectory 304). The motion fragment 300 is denoted herein with the symbol 'H'. An example of a motion fragment formula is shown below:

$$H=(J^{-Tau}, J^{-Tau+1}, \ldots, J^0, T^0, \ldots T^{Tau-1}, T^{Tau})$$

Tau is referred to as the planning horizon. The planning horizon tau being an amount of time (e.g., defined in frames or in time units) where the future trajectory is projected into the future and an amount of time where the past character poses are projected into the past. In the motion fragment, $T^0$ to $T^{Tau}$ are the root transforms included in the future trajectory 304, starting from the reference frame at $T^0$. The $J^{-Tau}$ to $J^0$ are the character poses included in the past character poses 306 from the end of the planning horizon to the reference frame, respectively. Each pose containing a plurality of joints. In accordance with an embodiment, there is provided a first value for the future planning horizon and a second value for the past planning horizon.

In accordance with an embodiment, a motion fragment is conveniently represented as a matrix where each entry contains the velocity of a joint at a time. For each joint, a maximum velocity is determined over the input data. This information is used to normalize the velocities when constructing a motion fragment, so that each entry in the matrix falls into the range $\{-1, +1\}$. In accordance with an embodiment, the first row of the matrix includes the velocities of the root transforms within the motion fragment, and each of the remaining rows includes the velocity of a single joint over the time horizon.

Cost Functions

In accordance with an embodiment, the MLAG system 100 relies on at least a cost function. The cost function simultaneously compares previous poses and a fixture trajectory from a first motion fragment to previous poses and a future trajectory from a second motion fragment. The cost function may compare poses and trajectories separately so that the poses of the first motion fragment are compared to the poses of the second motion fragment, and the trajectory of the first motion fragment is compared to the trajectory of the second motion fragment. In accordance with an embodiment, the similarity can be quantified using a cosine distance (also referred to as a cosine similarity) that uses the dot product of motion fragment elements between the first motion fragment and the second motion fragment divided by the product of the magnitude of the velocity elements within the first motion fragment and the magnitude of the velocity elements within the second motion fragment. In accordance with an embodiment, the similarity between fragments is defined by the squared L2 norm between fragments.

Main Loop

In accordance with an embodiment, during operation (e.g., during game play), the MLAG system continuously tracks the current character state which includes position and pose (e.g., $s^t=(T^i,J^i)$) and the current character trajectory.

Figure 4A:
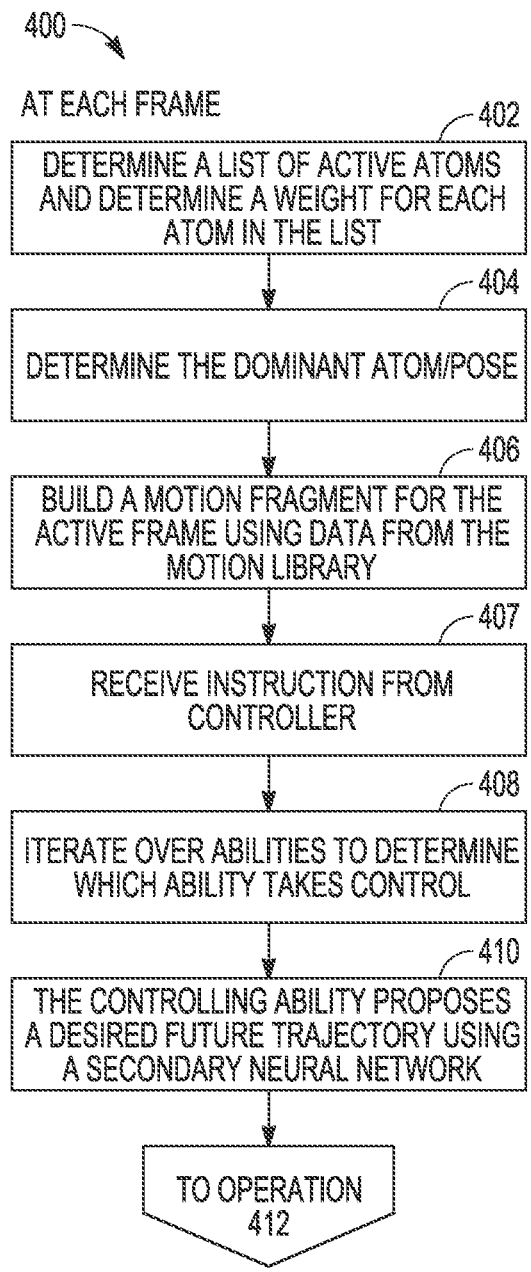
FIG. 4A is a flowchart illustrating a first part of a method for machine learning animation generation, in accordance with an embodiment.

In accordance with an embodiment and shown in FIG. 4A is a first part of a method 400 for machine learning animation generation, or MLAG method. The MLAG method 400 updates the state and trajectory and produces an active character pose. In accordance with an embodiment, the method 400 is performed once per active frame; however, the method 400 is not limited in this way and might be performed more frequently or less frequently. The active frame being a frame that is being prepared for rendering and displaying on a display device.

In accordance with an embodiment at operation 402 of the method 400, a motion synthesizer module within the MLAG system determines a list of atoms, wherein an atom is an index (e.g., a database reference or matrix reference) of a frame in the motion library D. An atom in the list has a weight (e.g., between 0 and 1) that represents the contribution of the atom to the active pose. The list of atoms and associated weights are used by the motion synthesizer to create a final skeletal pose for use in the active frame. In accordance with an embodiment, the atom weights are restricted in value so that the final skeletal pose is a convex combination (e.g., linear combination) of atoms in the list. In accordance with an embodiment, one atom in the list of atoms is tagged as a target atom. The target atom may change at each frame (e.g., as determined by operation 510 described below with respect to FIG. 5). As part of operation 402, the motion synthesizer determines a weight value for each atom in the list (e.g., which is updated each frame). The details of determining a weight value for an atom is described below with respect to FIG. 5. In accordance with an embodiment, as part of operation 402, and after an updating of the atom weights, the motion synthesizer generates an active pose (e.g., for the active frame) of a character using the list of atoms and associated weights. To generate the active pose, the motion synthesizer performs the following: for each atom on the list of atoms, retrieving from the motion library pose data associated with the atom (e.g., retrieving pose data associated with the index for the atom within the motion library); combining the retrieved pose data for all atoms using a convex (e.g., linear) combination of the poses using the weight associated with each pose as the contributing factor for the pose; sending the active pose data to a rendering module for display in the active frame.

In accordance with an embodiment, at operation 404 of the method 400, the motion synthesizer determines the dominant atom. In accordance with an embodiment, the dominant atom is an atom in the list that has the largest value of weight.

In accordance with an embodiment, at operation 406 of the method 400, the motion synthesizer generates a motion fragment using data from the motion library and associates the motion fragment with the active frame. The motion synthesizer generates the motion fragment from data associated with the dominant atom (e.g., the dominant atom determined in operation 404) and the associated pose data in the motion library. The motion fragment is constructed from a series of character poses in the motion library that precede the frame of the dominant atom (e.g., back over a time horizon) and from a series of root trajectories in the motion library that follow the frame of the dominant atom (e.g., forward over a time horizon).

In accordance with an embodiment, at operation 407 the MLAG system 120 receives instructions from a controller (e.g., game player using an input device or artificial intelligence). The instructions including at least a desired direction and velocity for the character and other data regarding moves including jumping, crawling, throwing, firing a weapon, or the like.

In accordance with an embodiment, at operation 408 of the method 400, the MLAG system iterates over a plurality of abilities to determine one ability of the said plurality of abilities to take control over the motion of a character. The control referring to the act of the ability proposing a desired future trajectory for the character. In accordance with an embodiment, an ability is a module (e.g., within the MLAG system) that uses as least a current state of a game environment (e.g., including position, pose and trajectory of a character within a game environment) as input and proposes a new future trajectory that reflects gameplay events such as gamepad inputs, AI decisions, and collisions with the environment. An ability may be linked to a type of motion, such as locomotion, climbing, jumping, parkour, and the like. An ability can restrict searching in the motion library for motion fragments and poses that are labeled according to the type of motion (e.g., locomotion ability only considers poses and motion fragments labeled as locomotion, parkour ability only considers poses and motion fragments labeled as parkour, climbing ability only considers poses and motion fragments labeled as climbing, the same applies to other abilities). There may be a plurality of abilities that are active at the same time. In accordance with an embodiment, there is provided a predefined priority list of abilities which may depend on a game state. For example, a melee ability might have a higher priority than a locomotion ability while in a fighting game state whereas the melee ability might have a lower priority that the locomotion ability while in a racing game state. Locomotion (e.g., of a character) is an ability that is very common during game play. In many embodiments, a locomotion ability would be a default ability that takes control when other abilities are silent. More complex game play includes other abilities that implement special moves such as parkour, fight moves, or interactions with the environment. As an example, based on a game including a playable character (PC), the locomotion ability would propose a future trajectory based in part on input from a human player (e.g., via a gamepad, joystick, keyboard or the like). Based on a game including a non-playable character (NPC), the locomotion ability would propose a future trajectory based in part on instructions from a controlling entity of the NPC (e.g., an artificial intelligence agent).

In accordance with an embodiment, at operation 410 the controlling ability generates a predicted future trajectory for a character using a neural network referred to as a trajectory prediction neural network and then modifies the future trajectory of the active motion fragment for the character (e.g., the motion fragment as created in operation 406) using the generated predicted future trajectory. More specifically, the future trajectory of the active motion fragment (e.g., generated at operation 406), is replaced by the predicted future trajectory from the trajectory prediction neural network to create a modified active motion fragment. The trajectory prediction neural network takes as input at least a current forward direction and velocity (e.g., from a current motion fragment) and the desired forward direction and velocity (e.g., as provided by the controller at operation 407) and as an output provides a series of root displacements that can be converted into a series of root transforms representing a predicted future trajectory. The structure and type of the trajectory prediction neural network can be any neural network structure and type. Movements associated with different motion islands can require different trajectory prediction neural networks. In accordance with an embodiment, movements associated with a motion island have an associated trajectory prediction neural network. For example, movements associated with parkour can have a first trajectory prediction neural network which is trained on parkour movement data, and movements associated with climbing can have a second trajectory prediction neural network trained on climbing movement data, and movements associated with locomotion can have a third trajectory prediction neural network trained on locomotion movement data, and the like.

In accordance with an embodiment, a climbing ability may not use the root transform position to generate a predicted future trajectory. For example, both a free-climbing (e.g., wall climbing) and a ledge-climbing ability may analyze a surrounding environment and generate a simplified geometry in order to position a character on a climbing surface within the environment (e.g., without using the root transform). The simplified geometry may be a plane in both cases; however the free-climbing ability and the ledge-climbing ability may use different parameterizations to indicate a position of the character on the climbing surface. For example, the free-climbing ability may use 2-dimensional normalized coordinates (e.g., known as {u,v}-coordinates) on the climbing surface and the ledge-climbing ability may use a ledge index and fraction scheme as a way to locate the motion of a character along an edge.

Since the animation poses in the active motion fragment and modified active motion fragment are explicitly generated from poses within the motion library, the probability of finding a motion fragment that simultaneously matches both the previous animation poses within the active motion fragment and the predicted future trajectory, depends on the correlation between the generated predicted future trajectory and the available data within the motion library. The use of the trajectory prediction neural network provides a strong correlation between the generated predicted future trajectory and the available motion data within the motion library, thus increasing the probability of finding a good match between the modified active motion fragment and the data within the motion library.

Figure 4B:
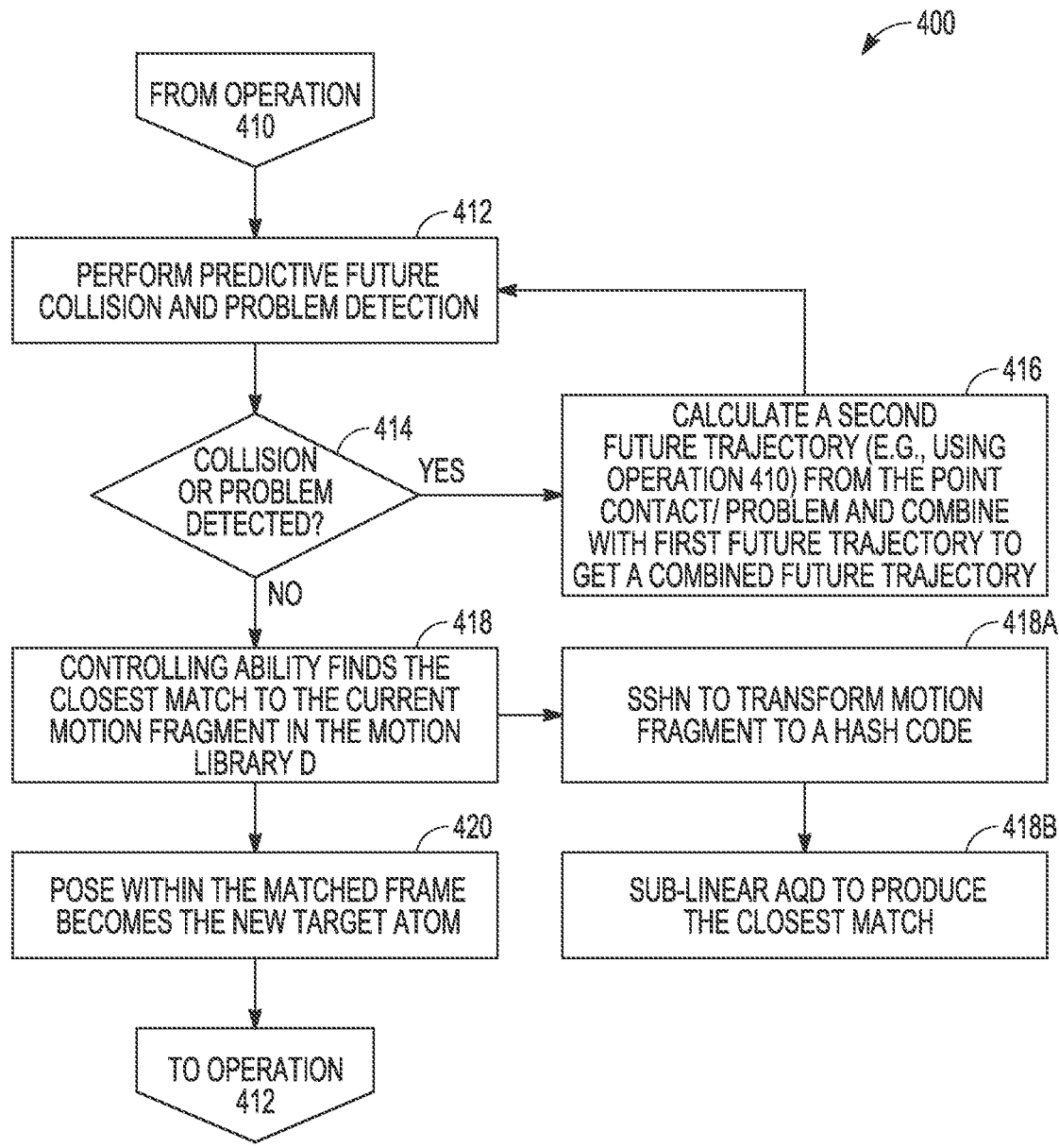
FIG. 4B is a flowchart illustrating a second part of a method for a second part of a method for machine learning animation generation, in accordance with an embodiment.

In accordance with an embodiment, and as shown in FIG. 4B is a second part to the method 400. At operation 412 of the method 400, the controlling ability performs post-processing of the predicted future trajectory calculated by the trajectory prediction neural network. As part of operation 412 the controlling ability performs predictive future collision detection by checking whether the future component of the modified active motion fragment intersects any obstacle in the environment. As part of operation 412, the controlling ability performs predictive future problem detection by checking whether the future component of the modified active motion fragment encounters a problem in the environment. The problem including a discontinuity of conditions required for the ability to function (e.g., if a future trajectory for a climbing ability encounters an end of a climbing surface). As an example, consider a right-hand-jump ability that proposes a right-hand-jump move when circumstances are favorable (e.g., making a jump makes sense only if there is an obstacle to jump over). The right-hand-jump ability may check for collisions between the character future trajectory and obstacles in the environment. If the game is designed in such a way that the jump can happen only if the player presses a key, then it is up to the ability to also check that the correct key has been pressed in order to enable the ability.

In accordance with an embodiment, at operation 416, based on a detected collision or problem, the controlling ability performs a second trajectory prediction to determine a second predicted future trajectory (e.g., using operation 410) and removes a portion of the active future trajectory that occurs after the detected collision or problem. The second trajectory prediction starting from a collision point and using an adjusted velocity and direction (e.g., an adjusted velocity and direction chosen to avoid the collision). The collision point being a point on the active future trajectory whereby a part of the character in motion (e.g., a bounding box of the character) collides with an obstacle in the environment. In accordance with an embodiment, as part of operation 416, the second predicted future trajectory is combined with the active future trajectory to create a new active future trajectory. The combination may include a smoothing of the combined new active future trajectory to eliminate abrupt changes close to the collision point. The controlling ability then loops back to operation 412 to perform a new prediction of future collision and problems for the new active future trajectory. In accordance with an embodiment, operation 412, operation 414 and operation 416 are performed in a loop until no collisions or problems are detected. Due to the use of motion fragments that include anticipated future positions of the character (e.g., the future trajectory), the MLAG system can anticipate a collision or problem ahead of time (e.g., a plurality of frames before the collision or problem occurs) and change the future trajectory of the character to avoid the collision or problem.

In accordance with an embodiment, as part of operation 416, based on a detected problem or collision, a first ability communicates with a second ability, and exchanges data. Based on the exchanged data, the second ability may take control from the first ability in order to avoid the collision or problem. For example, based on a locomotion ability detecting a future predicted collision (e.g., as part of operation 412), the locomotion ability shares the predicted collision information with other abilities. A dormant parkour ability may detect the shared predicted collision information, and analyze the vicinity of the detected collision for parkour movements that can avoid the predicted collision (e.g., jumping onto an obstacle, jumping off an obstacle, or performing tricks including wall runs and wall flips). Based on the parkour ability finding parkour movements that avoid the collision, the parkour ability may take control from the locomotion ability to calculate the second future trajectory using parkour movements (e.g., using operation 410 with a trajectory prediction neural network which is trained on parkour movement data).

In accordance with an embodiment, at operation 418 of the method 400, the controlling ability finds the closest matching motion fragment that is within the motion library to the active motion fragment (e.g., as modified by operation 410 and possibly operation 416). In accordance with an embodiment, as a first part of operation 418, at operation 418A, a siamese hashing neural network (SSHN) is used to transform the active motion fragment into a hash code. As a second part of operation 418, at operation 418B, a sub-linear AQD (asymmetric quantizer distance) nearest neighbour search is used to find the closest match between the hash code for the active motion fragment and a hash code from within the motion library (e.g., that represents a motion fragment similar to the active motion fragment).

In accordance with an embodiment, as part of operation 418A, a nonlinear hashing function is used that associates a compact B-bit hash code to each motion fragment, so that similarities between pairs of motion fragments is preserved. The SHNN architecture accepts motion fragments in a pairwise form (e.g., a first motion fragment and a second motion fragment) and processes them through a deep representation learning and hash coding pipeline that includes: (1) a sub-network with a 1-dimensional convolution-pooling layer to extract temporal filters as the representation of motions; (2) a fully-connected bottleneck layer to generate optimal dimension-reduced bottleneck representation; (3) a pairwise cosine loss layer for similarity-preserving learning; and (4) a product quantization loss for controlling hashing quality and the quantizability of the bottleneck representation. The entire network may be trained end-to-end in a supervised fashion. In accordance with an embodiment, at step 2 above, the motion fragment is transformed into a low-dimensional vector that has substantially the same similarity for all pairs of motion fragments.

In accordance with an embodiment, as part of operation 418B, a sub-linear approximate nearest neighbor search is performed in the database to find a frame whose low dimensional bottleneck representation (e.g., from the SHNN) is the most similar to a low dimensional bottleneck representation of the active modified motion fragment as determined from operation 418A. In accordance with an embodiment, a similarity between pairs of hash codes (e.g., a hash code from within the motion library and a hash code from the active modified motion fragment) is quantified as a cosine similarity between each hash code in the pair. In accordance with an embodiment, the similarity can be quantified using a cosine distance or cosine similarity that uses the dot product of the pair of hash codes divided by the product of the magnitude of the two hash codes. In accordance with an embodiment, at operation 420 of the method 400, based on a cosine similarity between an active modified motion fragment (e.g., as modified in operation 410 and possibly operation 416) and a closest match to the active modified motion fragment (e.g., as determined at operation 418) in the motion library being less than the cosine similarity between the active modified motion fragment and an unmodified motion fragment (e.g., as determined at operation 406), the frame for the closest match to the active modified motion fragment from the motion library becomes the new target atom and the MLAG returns to operation 402 of the method 400. However, based on the cosine similarity between the active modified motion fragment and the closest match to the active modified motion fragment in the motion library being greater than the cosine similarity between the active modified motion fragment and the unmodified motion fragment, the frame for the closest match to the active modified motion fragment from the motion library is discarded and the previous target atom remains the target atom and the MLAG returns to operation 402 of the method 400.

Figure 5:
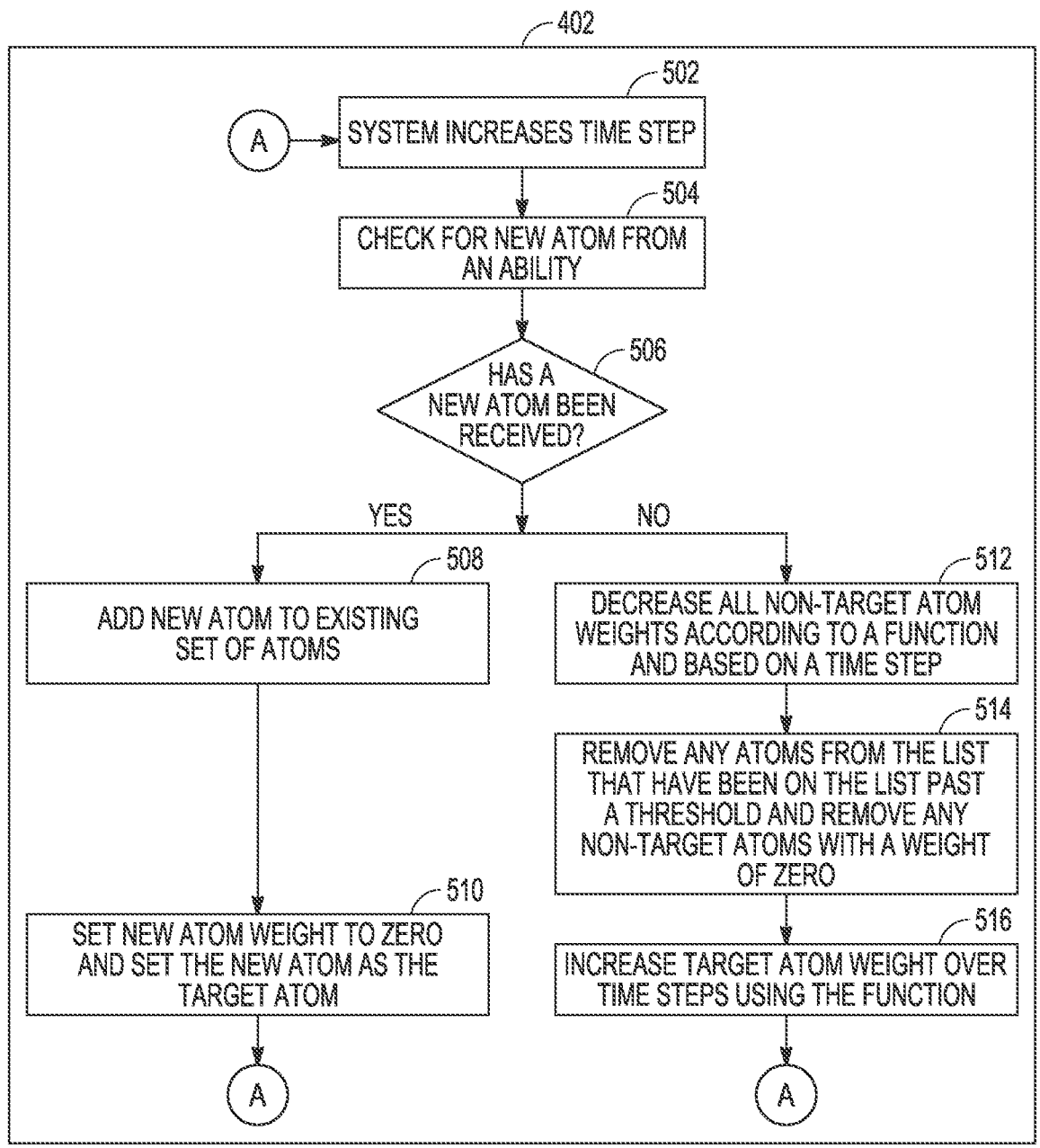
FIG. 5 is a method for updating weights for a plurality of character poses within a machine learning animation generation system, in accordance with an embodiment.

In accordance with an embodiment, and shown in FIG. 5 is a method for modifying weights for a list of atoms (e.g., as part of operation 402). At operation 502 of the method, the MLAG system increases a time step. The time step may be linked to a frame rate for a display (e.g., time step=1/frame rate), so that a 60 frame per second display rate has a time step of approximately 16.7 milliseconds. At operation 504 of the method, the MLAG system checks for a new atom from an ability (e.g., as determined at operation 420 of the method 400). In accordance with an embodiment, at operation 512, based on no new atom being received, the MLAG system decreases all non-target atom weights according to a function wherein the function is based at least in part on the time step. In accordance with an embodiment, at operation 514, based on no new atom being received, the MLAG system removes any atoms from the list that have been on the list longer than a time threshold. Furthermore, at operation 514 the MLAG system removes any non-target atom with a weight equal to zero. In accordance with an embodiment, at operation 516, based on no new atom being received, the MLAG system increases the target atom weight using a function wherein the function is based at least in part on the time step. In accordance with an embodiment, at operation 508, based on a new atom being received, the MLAG system adds the new atom to the list of atoms. In accordance with an embodiment, at operation 510, based a new atom being received, the MLAG system sets the new atom weight to zero and sets the new atom as the target atom.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
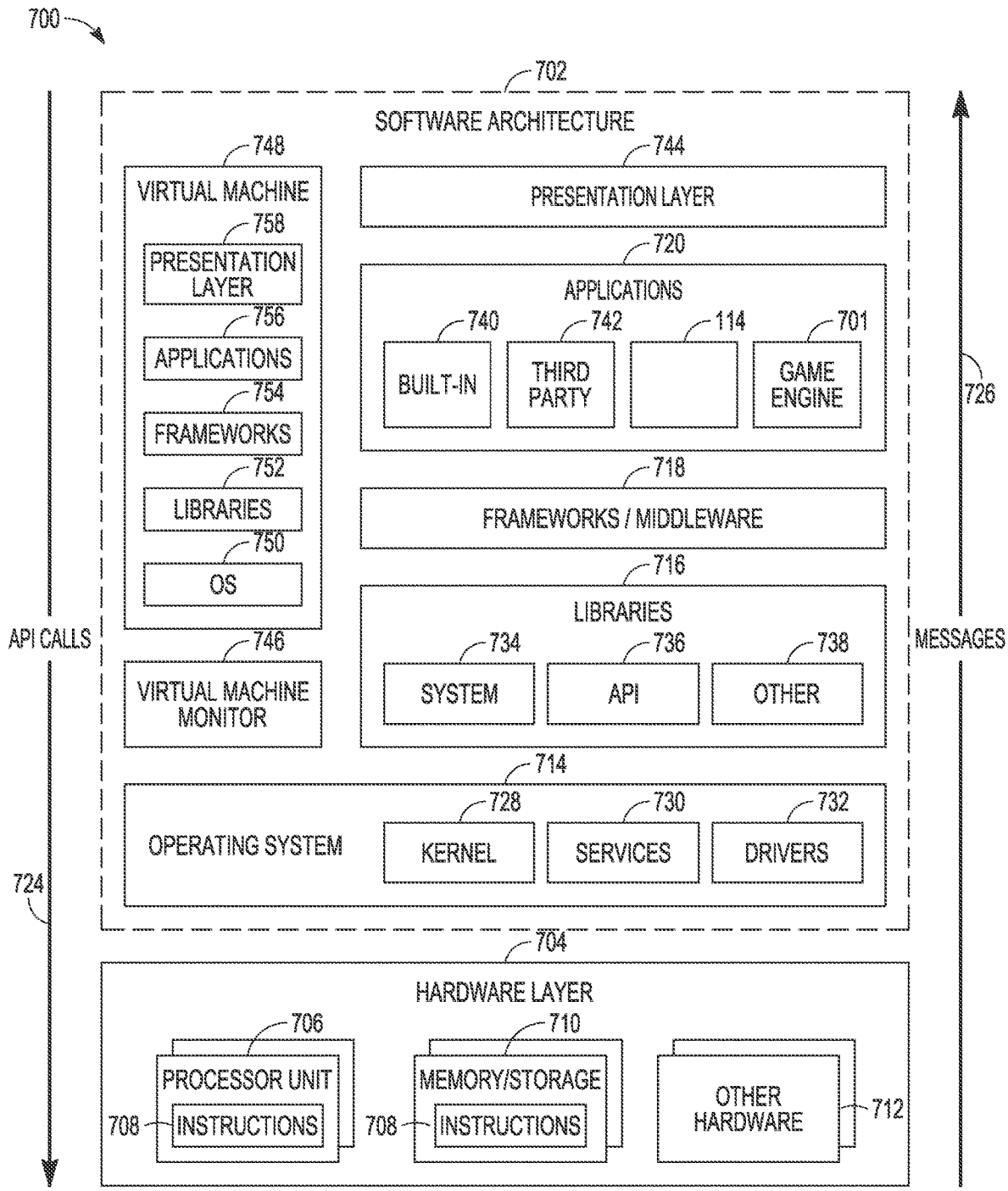
FIG. 6 is a block diagram illustrating an example software architecture, which may be used in conjunction with various hardware architectures described herein.

FIG. 6 is a block diagram 700 illustrating an example software architecture 702, which may be used in conjunction with various hardware architectures herein described to provide a gaming engine 701 and/or components of the MLAG system 200. FIG. 6 is a non-limiting example of a software architecture and it will be appreciated that many other architectures may be implemented to facilitate the functionality described herein. The software architecture 702 may execute on hardware such as a machine 800 of FIG. 7 that includes, among other things, processors 810, memory 830, and input/output (I/O) components 850. A representative hardware layer 704 is illustrated and can represent, for example, the machine 800 of FIG. 7. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 6, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., a C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 6, this is illustrated by a virtual machine 748. The virtual machine 748 creates a software environment where applications/modules can execute as if they were executing on a hardware machine (such as the machine 800 of FIG. 7, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 7:
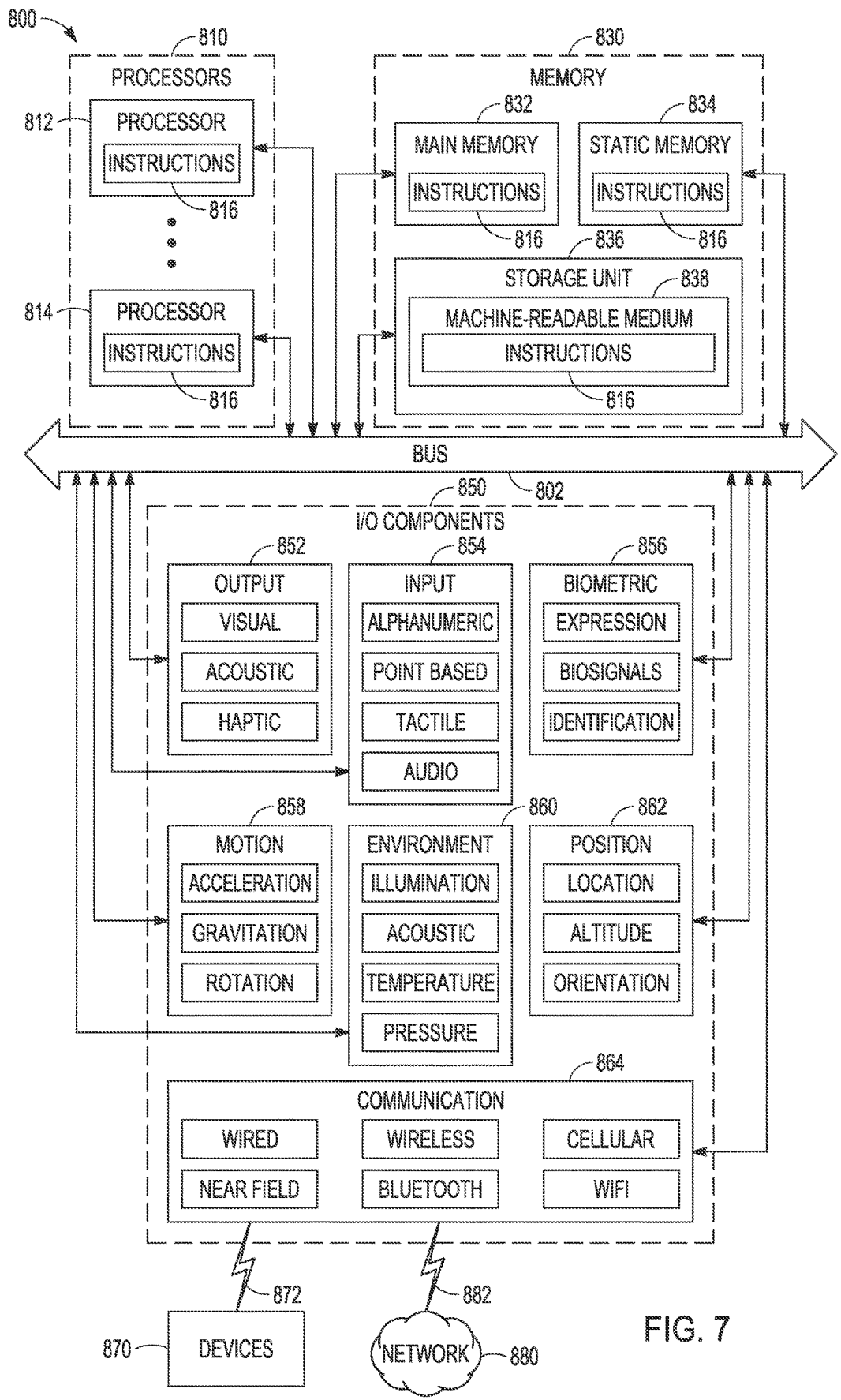
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 7 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 7 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 7. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a. physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
  one or more computer processors;
  one or more computer memories;
  a set of instructions incorporated into the one or more computer memories, the set of instructions configuring the one or more computer processors to perform operations comprising:
   determining a dominant atom from a set of active atoms associated with a character based on weights associated with the set of active atoms, each atom of the set of active atoms including a reference to data defining a character pose within a motion library;
   determining a motion controlling ability from a plurality of abilities of the character based on priorities of the abilities and a current game state produced within a game;
   determining a motion fragment for the dominant atom based on pose data and future trajectory data in the motion library associated with the dominant atom;
   calculating a predicted future trajectory of the character based on the motion fragment, the controlling ability, and control data from an input device;
   based on a detection of a future collision or problem between the predicted future trajectory and an environment within the game, calculating a combined future trajectory based on the predicted future trajectory and an additional future trajectory;
   determining a combined motion fragment by replacing the future trajectory of the motion fragment with the predicted future trajectory or combined future trajectory;
   converting the combined motion fragment to a hash value using a hashing function and using a nearest neighbor search to find the closest match between the hash value and a second hash value in the motion library;
   adding the atom associated with the second hash value to the set of active atoms as a target atom;
   posing the character in a frame based on a weighted combination of poses associated with the set of active atoms; and
   changing the weights associated with the set of active atoms based on a time function, the changing including increasing the weight of the target atom and decreasing the weight of all other atoms.

2. The system of claim 1, wherein the predicted future trajectory and the additional future trajectory are determined using a trajectory prediction neural network trained on animation data to predict trajectories of animated characters.

3. The system of claim 1, wherein the motion library comprises a plurality of animation clip data organized into motion fragments centered on a plurality of poses in the motion library, and with the motion fragments converted to hash values by the hashing function.

4. The system of claim 1, wherein the additional future trajectory is determined starting from a location of the collision or problem and with a new direction to avoid the collision or problem.

5. The system of claim 1, wherein the motion fragment includes a plurality of character poses from the motion library preceding the dominant atom and a future trajectory following the dominant atom.

6. The system of claim 1, wherein the converting the combined future trajectory to a hash value includes using a hash function determined by a siamese hash neural network trained on motion fragments within the motion library.

7. The system of claim 2, wherein the trajectory prediction neural network is trained on a type of motion, and the motion controlling ability is associated with the type of motion, and has a priority based on the type of motion.

8. A method comprising:
  determining a dominant atom from a set of active atoms associated with a character based on weights associated with the set of active atoms, each atom of the set of active atoms including a reference to data defining a character pose within a motion library;
  determining a motion controlling ability from a plurality of abilities of the character based on priorities of the abilities and a current game state produced within a game;
  determining a motion fragment for the dominant atom based on pose data and future trajectory data in the motion library associated with the dominant atom;

calculating a predicted future trajectory of the character based on the motion fragment, the controlling ability, and control data from an input device;

based on a detection of a future collision or problem between the predicted future trajectory and an environment within the game, calculating a combined future trajectory based on the predicted future trajectory and an additional future trajectory;

determining a combined motion fragment by replacing the future trajectory of the motion fragment with the predicted future trajectory or combined future trajectory;

converting the combined motion fragment to a hash value using a hashing function and using a nearest neighbor search to find the closest match between the hash value and a second hash value in the motion library;

adding the atom associated with the second hash value to the set of active atoms as a target atom;

posing the character in a frame based on a weighted combination of poses associated with the set of active atoms; and changing the weights associated with the set of active atoms based on a time function, the changing including increasing the weight of the target atom and decreasing the weight of all other atoms.

9. The method of claim 8, wherein the predicted future trajectory and the additional future trajectory are determined using a trajectory prediction neural network trained on animation data to predict trajectories of animated characters.

10. The method of claim 8, wherein the motion library comprises a plurality of animation clip data organized into motion fragments centered on a plurality of poses in the motion library, and with the motion fragments converted to hash values by the hashing function.

11. The method of claim 8, wherein the additional future trajectory is determined starting from a location of the collision or problem and with a new direction to avoid the collision or problem.

12. The method of claim 8, wherein the motion fragment includes a plurality of character poses from the motion library preceding the dominant atom and a future trajectory following the dominant atom.

13. The method of claim 8, wherein the converting the combined future trajectory to a hash value includes using a hash function determined by a siamese hash neural network trained on motion fragments within the motion library.

14. The method of claim 9, wherein the trajectory prediction neural network is trained on a type of motion, and the motion controlling ability is associated with the type of motion, and has a priority based on the type of motion.

15. A non-transitory machine-readable medium storing a set of instructions that, when executed by at least one processor, cause the at least one processor to perform operations comprising:

determining a dominant atom from a set of active atoms associated with a character based on weights associated with the set of active atoms, each atom of the set of active atoms including a reference to data defining a character pose within a motion library;

determining a motion controlling ability from a plurality of abilities of the character based on priorities of the abilities and a current game state produced within a game;

determining a motion fragment for the dominant atom based on pose data and future trajectory data in the motion library associated with the dominant atom;

calculating a predicted future trajectory of the character based on the motion fragment, the controlling ability, and control data from an input device;

based on a detection of a future collision or problem between the predicted future trajectory and an environment within the game, calculating a combined future trajectory based on the predicted future trajectory and an additional future trajectory;

determining a combined motion fragment by replacing the future trajectory of the motion fragment with the predicted future trajectory or combined future trajectory;

converting the combined motion fragment to a hash value using a hashing function and using a nearest neighbor search to find the closest match between the hash value and a second hash value in the motion library;

adding the atom associated with the second hash value to the set of active atoms as a target atom;

posing the character in a frame based on a weighted combination of poses associated with the set of active atoms; and changing the weights associated with the set of active atoms based on a time function, the changing including increasing the weight of the target atom and decreasing the weight of all other atoms.

16. The non-transitory machine-readable medium of claim 15, wherein the predicted future trajectory and the additional future trajectory are determined using a trajectory prediction neural network trained on animation data to predict trajectories of animated characters.

17. The non-transitory machine-readable medium of claim 15, wherein the motion library comprises a plurality of animation clip data organized into motion fragments centered on a plurality of poses in the motion library, and with the motion fragments converted to hash values by the hashing function.

18. The non-transitory machine-readable medium of claim 15, wherein the additional future trajectory is determined starting from a location of the collision or problem and with a new direction to avoid the collision or problem.

19. The non-transitory machine-readable medium of claim 15, wherein the motion fragment includes a plurality of character poses from the motion library preceding the dominant atom and a future trajectory following the dominant atom.

20. The non-transitory machine-readable medium of claim 15, wherein the converting the combined future trajectory to a hash value includes using a hash function determined by a siamese hash neural network trained on motion fragments within the motion library.

* * * * *

UNITED STATES PATENT AND TRADEMARK OFFICE
CERTIFICATE OF CORRECTION

PATENT NO. : 10,717,004 B2
APPLICATION NO. : 16/444977
DATED : July 21, 2020
INVENTOR(S) : Michael Buttner Page 1 of 1

It is certified that error appears in the above-identified patent and that said Letters Patent is hereby corrected as shown below:

On the Title Page

On page 2, in Column 1, item [56], Line 49, delete "Ernbeddings"," and insert --Embeddings",-- therefor Signed and Sealed this
Twelfth Day of January, 2021

Andrei Iancu
*Director of the United States Patent and Trademark Office*